Figure 1:
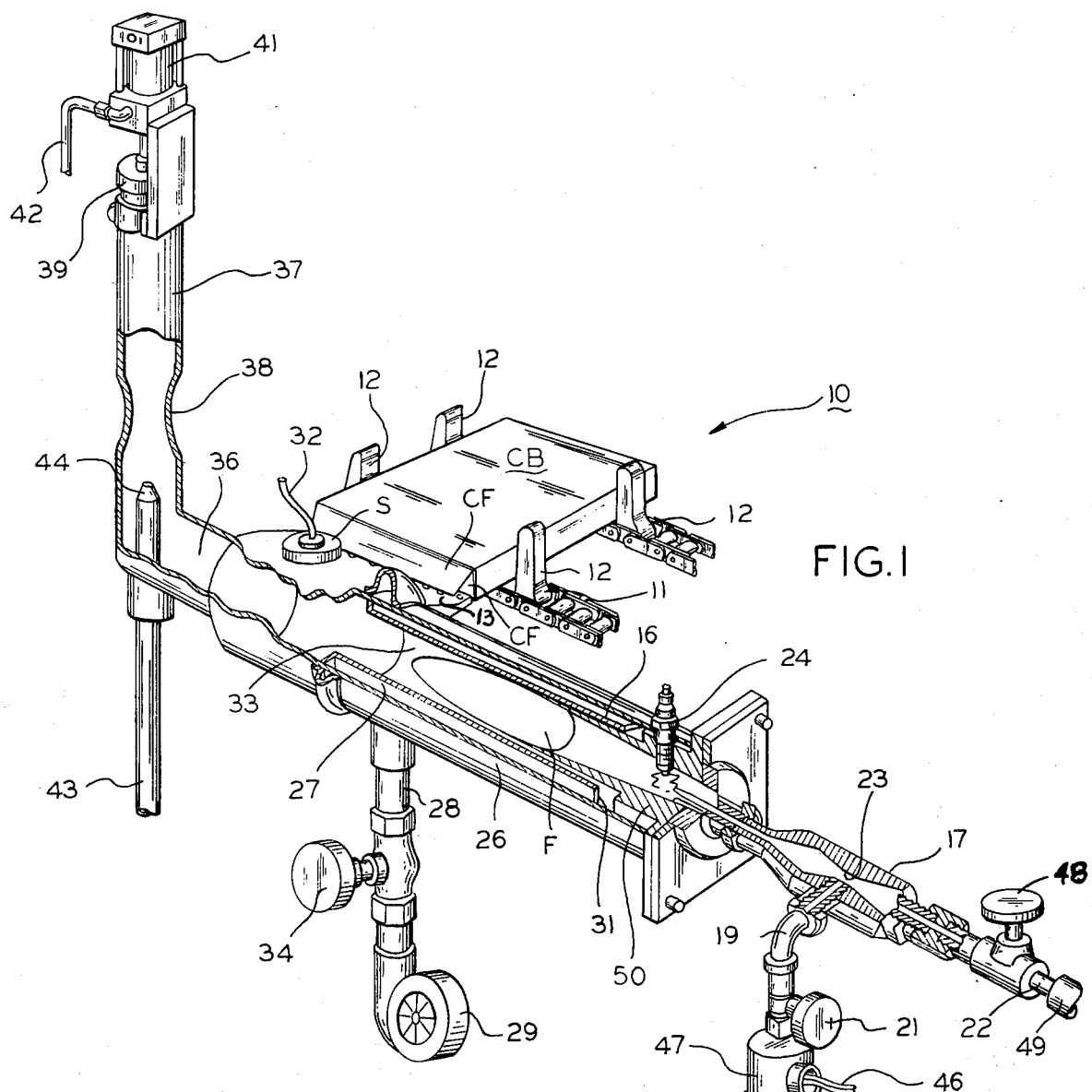

United States Patent [19]

Karpinsky

[11] 4,052,154

[45] Oct. 4, 1977

[54] APPARATUS FOR HEAT SEALING OF CONTAINER BODIES

[75] Inventor: William J. Karpinsky, Audubon, Pa.

[73] Assignee: Container Corporation of America, Chicago, Ill.

[21] Appl. No.: 690,993

[22] Filed: May 28, 1976

[51] Int. Cl.² .......................... F24H 1/00; F24J 3/00
[52] U.S. Cl. ..................................... 432/222; 432/230
[58] Field of Search ................... 432/222, 230; 34/48

[56] References Cited

U.S. PATENT DOCUMENTS

| | | |
|---|---|---|
| 3,562,920 | 2/1971 | Vuilleumier et al. .................. 34/48 |
| 3,847,540 | 11/1974 | Farfaglia et al. ..................... 432/230 |
| 3,917,442 | 11/1975 | Zagoroff .............................. 432/222 |

Primary Examiner—John J. Camby
Attorney, Agent, or Firm—Carpenter & Ostis

[57] ABSTRACT

A machine for conveying container bodies for heat sealing of surfaces thereof is disclosed. Structure is provided for introducing heated air to said surfaces while the bodies are moving in a conveyor path and for modulating the temperature of the heated air in accordance with sensor means disposed in relationship to the surfaces to be heated.

17 Claims, 2 Drawing Figures

U.S. Patent  Oct. 4, 1977  4,052,154

APPARATUS FOR HEAT SEALING OF CONTAINER BODIES

BACKGROUND OF THE INVENTION

The invention herein is related particularly to packaging machinery of the type wherein closure of container flaps having heat sealable surfaces is effected by heated air directed against the surfaces to condition the same prior to closing of the container flaps.

SUMMARY OF THE INVENTION

According to the invention the temperature of the heated air is modulated at a point remote from the point of entrance of such air to a tube supplying the heated air to a nozzle directing the air against the surfaces to be heated, so that it is not necessary to modulate the temperature of the heated air at the point where it enters the tube, the amount of temperature modulating air being a great deal less than the amount of air being supplied at the tube entrance.

THE DRAWING

Figure 2:
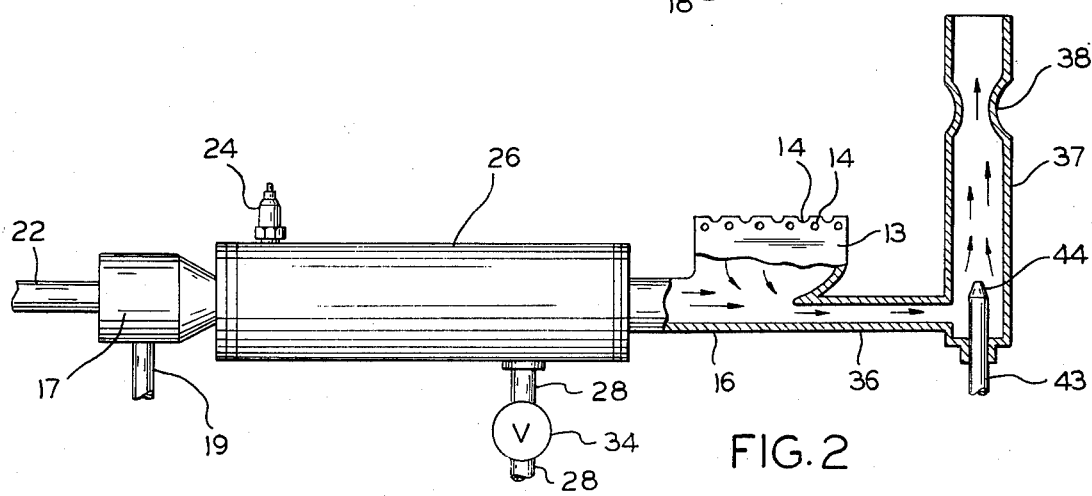

FIG. 1 is an isometric view of apparatus embodying features of the present invention; and FIG. 2 is an elevational view, certain parts being shown in longitudinal cross section.

The apparatus according to the present invention is denoted generally by the reference numeral 10, and is shown in the environment of an endless packaging conveyor 11 having spaced trapping lugs 12 for trapping a container body CB therebetween. Container body CB has closure flaps CF thereon coated with a material adapted to be heated to a suitable temperature to a condition for subsequent sealing of one flap CF to another by structure, not shown, and well known in the art.

In the heating of the flaps CF a blast of heated air is directed thereagainst by a nozzle 13 having openings 14 therein. Nozzle 13 is connected to a tube 16 supplying heated air to nozzle 13.

Structure is provided for supplying a moving column of heated air to tube 16 and nozzle 13 and includes a fuel-air mixing device 17 connected to a source 18 of gaseous fuel by a supply line 19, there being a fuel supply adjusting valve 21 interposed in line 19 between source 18 and mixing device 17.

An air supply 49 for mixing device 17 is provided, there being one air supply adjustment valve 48 interposed in a line 22 between source 49 and mixing device 17. Fuel and air are mixed and ignited by a spark plug 24 supported on a tube 50 to create a burning flame F, the heated gases being thereby supplied to nozzle 13.

Structure is provided for modulating the temperature of the heated gases to the end that heat of a proper temperature is supplied to flaps CF. Such structure is adapted to supply extra cooling air as required without modulation of the fuel-air mixture at mixing device 17 once the optimum combustion ratio is established, and in such a fashion that the modulating (cooling) air is supplied at a point remote from where ignition takes place.

To this end tube 50 is surrounded by inner jacket 16 and outer jacket 26 defining with tube 50 an annular chamber 27 for the supply of modulating air from a souce 29 connected by a tube 28 to chamber 27. Air from source 29 moves through chamber 27 past the end 31 of inner jacket 16 and on past the end of tube 50 to chamber 33 located downstream of the point where ignition takes place by spark plug 24 creating flame F.

Structure is provided for modulating the amount of air introduced into chamber 27 including an air supply adjustment valve 34 interposed in line 28 between source 29 and chamber 27 and also including a sensor S mounted at nozzle 13 and connected by a control lead 32 to a gauge for indicating the temperature at nozzle 13.

The supply of modulating air is operable to cool flame F by traversing through chamber 27 as well as by direct contact with flame F.

As taught in Vuillemeier et al U.S. Pat. No. 3,562,920; upon cessation of movement of conveyor 11 structure is provided to bypass the supply of heated air to nozzle 13, and cessation of movement is accompanied by aspiration of chamber 33. Chamber 33 is co-extensive with bypass tube 36 and a riser tube 37 having a constriction 38 therein, riser tube 37 terminates at the upper end thereof in valve 39 operated by a cylinder 41 supplied with motive fluid by a line 42. When conveyor 11 stops, valve 39 opens, and a supply of air is introduced within riser tube 37 adjacent constriction 38 by way of a pipe 43 terminating in a nozzle 44 operable to aspirate tube 33.

I claim:

1. In a machine for bonding selected surfaces of moving container bodies by the application of heat thereto:
   a. Nozzle means for directing heated air against the selected surfaces of said moving bodies;
   b. a tube for providing a supply of heated air connected to said nozzle means;
   c. other means for introducing a temperature modulating source of air remote from the point where heated air is supplied to said tube to control the temperature of the air within said tube and at said nozzle means.

2. The invention according to claim 1 including sensing means disposed adjacent said nozzle means and said selected surfaces for sensing the temperature thereat.

3. The invention according to claim 1, wherein said tube is provided with a jacket spaced therefrom to provide a chamber for movement of air from said temperature modulating source.

4. The invention according to claim 3, wherein said chamber has an opening to said tube remote from the point where heated air is supplied thereto, so that air from said temperature modulating source travels along said chamber for modulating the temperature of said heated air.

5. The invention according to claim 1 wherein said source of temperature modulating air includes a blower connected to the means for introducing said source of temperature modulating air to said tube.

6. The invention according to claim 5, wherein a regulating valve is interposed between said blower and said nozzle means.

7. The invention according to claim 2, wherein said means for sensing the temperature controls the operation of a regulating valve located adjacent said other means.

8. The invention according to claim 2, and including valve means for controlling said other means.

9. The invention according to claim 8, and including means for automatically adjusting said valve means responsive to said sensing means.

10. In a machine for conveying container bodies formed from paperboard or the like and for bonding selected surfaces thereon by the application of heat thereto:
   a. nozzle means for directing heated air against said surfaces;
   b. means for providing a supply of heated air to said nozzle means comprising a burner tube connected to a source of fuel and combustion supporting gas and including means for igniting and burning a fuel-air mixture in said burner tube;
   c. means for introducing a temperature modulating source of air to said burner tube remote from the point where ignition of said fuel-air mixture takes place to control the temperature of the burning mixture within said tube within limits without disturbing the ignition and combustion of the fuel-air mixture.

11. The invention according to claim 10, wherein said machine has means disposed adjacent said nozzle and said selected surfaces for sensing the temperature thereat.

12. The invention according to claim 11, wherein said burner tube is provided with jacket spaced therefrom to provide a chamber for movement of air from said temperature modulating source to said tube.

13. The invention according to claim 12, wherein said chamber has an opening to said burner tube spaced from the point where said ignition means are disposed, so that air from said temperature modulating source travels along said chamber for modulating the temperature of said burning mixture.

14. The invention according to claim 10, wherein said source of temperature modulating air includes a blower connected to the means for introducing said source of temperature modulating air to said 15. The invention according to claim 14, wherein a regulating valve is interposed between said blower and said nozzle means.

16. The invention according to claim 15, wherein said means for sensing said temperature control the operation of said regulating valve.

17. A machine according to claim 11, wherein said sensing means modulates the amount of air supplied for modulating the temperature of said burning mixture.

* * * * *